United States Patent [19]

Kienle

[11] Patent Number: 4,537,162

[45] Date of Patent: Aug. 27, 1985

[54] INTERNAL COMBUSTION ENGINE HAVING A ROTATING PISTON ASSEMBLY

[76] Inventor: Gerhard K. Kienle, Schonwalterstrasse 11, D-7000, Stuttgart 31, Fed. Rep. of Germany

[21] Appl. No.: 453,035

[22] Filed: Dec. 27, 1982

[30] Foreign Application Priority Data

Dec. 21, 1981 [DE] Fed. Rep. of Germany ....... 3150654

[51] Int. Cl.³ .............................................. F02B 53/00
[52] U.S. Cl. .................................... 123/43 R; 91/177; 418/265
[58] Field of Search ................... 123/43 R, 44 R, 241; 418/265, 161, 164; 91/196, 495, 491, 177, 176

[56] References Cited

U.S. PATENT DOCUMENTS

| | | | |
|---|---|---|---|
| 925,203 | 6/1909 | Leiman et al. | 91/177 X |
| 1,117,464 | 11/1914 | Twombly | 123/44 R |
| 1,209,204 | 12/1916 | Richards | 123/43 |
| 1,232,850 | 7/1917 | Saunders | 123/43 R |
| 1,469,836 | 10/1923 | Holdinghausen | 91/177 |
| 2,362,541 | 11/1944 | De Lancey | 418/265 X |
| 3,364,908 | 1/1968 | Herpolsheimer | 123/241 |
| 3,545,413 | 12/1970 | Freitas | 418/265 X |
| 3,871,337 | 3/1975 | Green et al. | 123/43 X |
| 3,931,809 | 1/1976 | Corte et al. | 123/43 R |
| 4,149,833 | 4/1979 | Baudin | 123/43 R |

FOREIGN PATENT DOCUMENTS 450469  1/1913  France ............................. 123/44 R

*Primary Examiner*—Michael Koczo
*Attorney, Agent, or Firm*—Jones, Tullar & Cooper

[57] ABSTRACT

An internal combustion engine having a rotating piston assembly is proposed in which the rotating piston assembly includes a cylinder which rotates about its longitudinal axis, at least one piston element pivotably mounted at one end within the cylinder for pivotal movement in the radial direction of the cylinder, at least one work chamber disposed adjacent to at least one piston element, and at least one valve slide which is displaceable with the piston element for controlling flow into and out of the work chamber.

35 Claims, 5 Drawing Figures

INTERNAL COMBUSTION ENGINE HAVING A ROTATING PISTON ASSEMBLY

BACKGROUND OF THE INVENTION

1. Field of the Invention

The present invention relates to an internal combustion engine having a rotating piston assembly, with a housing including a mixture inlet, an exhaust gas outlet, at least one valve and a drive shaft.

2. Prior Art

Internal combustion engines of this kind are known as rotary piston engines. As compared with reciprocating piston engines, rotary piston engines have the mechanical advantage that the conversion of motion is not necessary and that free inertial forces do not arise. However, sealing the rotating piston with respect to the housing is difficult and relatively expensive in rotary piston engines. The geometry of the rotating piston and the interior of the housing is also relatively complicated, so that manufacturing these two parts is expensive in terms of cost and effort. The eccentric support of the rotating piston with respect to the center of the housing is a further factor contributing to increased and complicated efforts to accomplish the drive connection of the piston and the drive shaft.

OBJECT AND SUMMARY OF THE INVENTION

It is therefore a principal object of the present invention to provide an internal combustion engine having a rotating piston assembly of the type described above, which is simpler in terms of its geometrical and structural design and in which the problems associated with sealing are substantially less.

This object is attained by an internal combustion engine having a rotating piston assembly including a cylinder rotating about its longitudinal axis; at least one piston element disposed within the cylinder and supported such that it is pivotable in the radial direction; a valve slide support for displacement to one wall of the cylinder, and at least one work chamber defined by the piston element and interior wall areas of the cylinder. Movements of the piston element and the valve slide are controlled in a coordinated manner in accordance with the rotational movement of the cylinder.

The internal combustion engine having rotating piston assembly according to the invention has a substantially simpler design geometrically and hence structurally, because the element that revolves with the piston elements has a simple, circular geometric form both inside and outside. The cylinder rotates about its longitudinal axis, so that no eccentric motion that would require expensive transmission mechanisms takes place. Sealing problems are reduced, similarly to the case of the reciprocating piston engine, substantially to the sealing of elements moving linearly counter to one another such as the piston element and the valve slide.

In a preferred exemplary embodiment of the present invention, two piston elements offset by 180° from one another are pivotably articulated in the cylinder of the rotating piston assembly. The result is an apparatus in which the forces of inertia within the rotating system substantially cancel one another out. In a four-stroke engine, the two piston elements operate in opposite directions, synchronized in a reinforcing manner.

The piston elements have a simple circular-arc shape, which is adapted at least on the side oriented toward the work chamber to the radius of the interior wall of the cylinder. The piston element is articulated at one end to a stationary pivoting shaft, while the free end is connected to a one-armed lever which is held on a shaft that is eccentric to the axis of rotation of the cylinder. In this manner, the rotation of the cylinder is effected by the two piston elements, which are moved back-and-forth in opposed strokes, thus increasing and decreasing the size of the work chambers.

The radial movement of the valve slide is controlled in a compulsory manner as well as by the rotational movement of the cylinder, such that the slides are guided in a slotted-link guide that is provided on an opposite cap of the stationary housing receiving the rotating piston assembly.

The cooling of the internal combustion engine can be accomplished according to the present invention in a very simple manner; that is, an annular gap exists between the rotating cylinder and the housing, the bottom and top of the gap being provided with entrance and exit openings for the coolant. Cooling fins secured to the cylinder may be provided in the annular gap. It is also possible for the cooling to take place inside the rotating cylinder inside that chamber which is defined by (among other elements) the side of the piston element remote from the work chambers. The supply and removal of the coolant, for instance oil, is preferably effected at the bottom via the housing and the bottom of the rotating cylinder. An advantage here is that it is not necessary to drive the coolant with a separate pump, because the piston elements act as pumps as they move radially back-and-forth.

The internal combustion engine having a rotating piston assembly according to the invention may be used for both so-called Otto engines and Diesel engines. When it is used as an Otto engine, two spark plugs are advantageously disposed on the rotating cylinder at locations oriented toward the particular part of the side of the work chamber located opposite the free end at a given time of the piston element. A contact disposed on the housing and protruding into the annular gap is associated with the two spark plugs, so that a given spark plug will always spark whenever it comes into contact with this stationary contact.

Further details and embodiments of the invention will become apparent from the following description, in which the invention is explained with reference to the exemplary embodiments shown in the drawing.

DETAILED DESCRIPTION OF THE PREFERRED EMBODIMENTS

Figure 1:
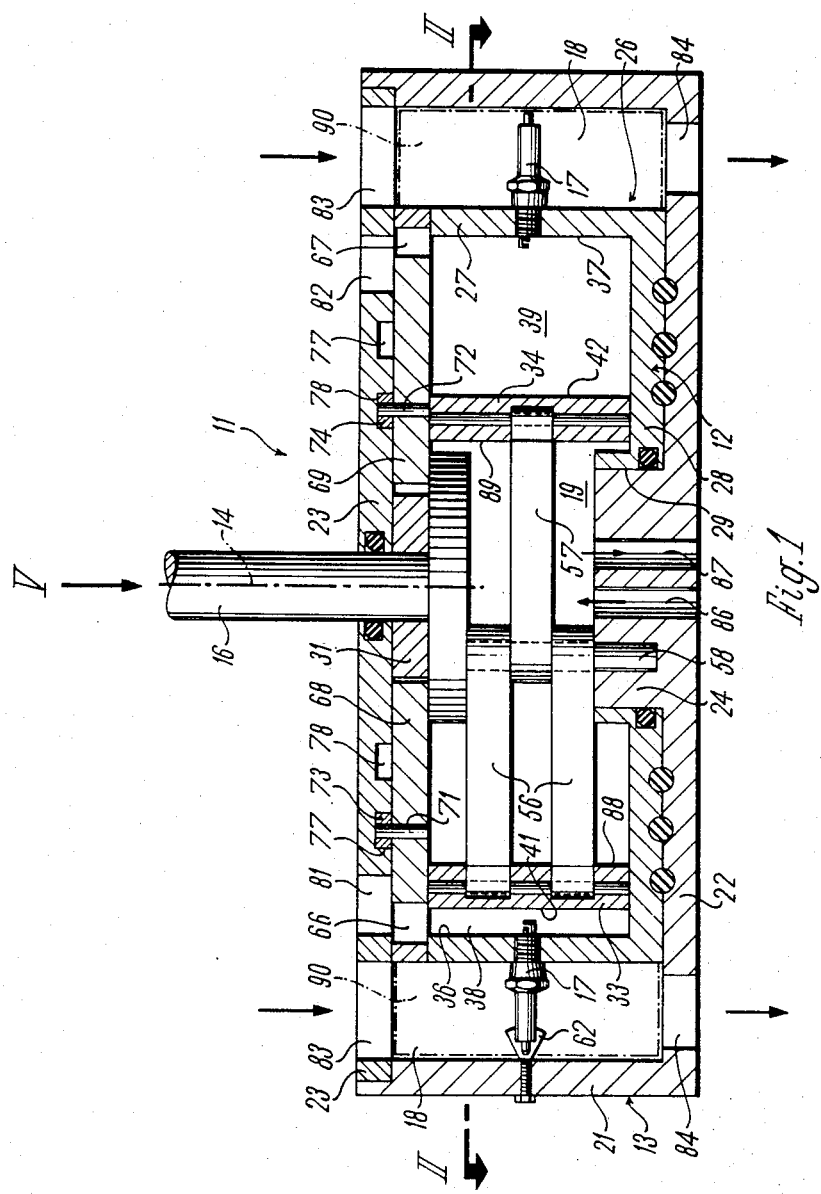
FIG. 1, schematically illustrates a vertical cross section through an internal combustion engine having a rotating piston assembly according to a preferred exemplary embodiment of the present invention.

The internal combustion engine 11 shown in the drawing and according to a preferred exemplary embodiment of the present invention is provided with a rotating piston assembly 12, which is disposed concentrically inside a stationary housing or engine block 13 and is supported such that it is rotatable about the common longitudinal axis 14. A drive shaft 16 is firmly connected directly with the rotating piston assembly 12. Although in the illustrated exemplary embodiment the engine 11 is shown as one which has externally supplied ignition by means of spark plugs 17, that is, in the form of an Otto engine, it will be understood that this engine can also, in principle, be used in the form of a self-igniting or Diesel engine. As will be shown later, the four-stroke mode of operation is used in the engine 11 according to the invention, this mode comprising in a known manner the steps of:

1. Aspiration of the gas-air mixture;
2. Compression of this mixture;
3. Combustion with subsequent expansion of the combusted gas; and
4. Expulsion of the exhaust gas.

The internal combustion engine 11 is furthermore provided with an outer chamber 18 and/or an inner chamber 19 for the purpose of cooling.

Before the schematic illustration is explained in detail, it should be noted that the drawing is purely a schematic illustration of the internal combustion engine 11 according to the invention, since neither bearings between the rotating and the stationary parts nor seals between the parts that move relative to one another and the parts that define the work chambers are shown. It will be understood that these elements are present in the engine in an appropriate manner.

As shown in FIG. 1, the housing or engine block 13 is composed of a cylindrical jacket 21, a bottom wall 22 either firmly connected thereto or in one piece therewith and a cap or top wall 23 which can be connected firmly to the cylinder jacket 21. The bottom wall 22 is provided with a bearing block 24 for the rotating piston assembly 12. The bearing block 24 extends inward and is disposed concentrically with the axis of rotation 14. Preferably, the bearing block 24 is formed with the bottom wall 22, for example by casting.

The rotating piston assembly 12 has a cylinder 26, which is rotatably supported inside the engine block 13. The cylinder 26 has an outer cylinder jacket 27, into which the two spark plugs 17 are threaded, diametrically opposite one another; a bottom wall 28, which defines a bore 29; and a cap or transverse end wall 31 which is connected in a rotationally fixed manner with the jacket 27, but is removable therefrom. The cap 31 has a drive shaft 16 connected thereto in a rotationally fixed manner. The bore 29 of the bottom wall 28 of the cylinder 26, the longitudinal axis of which coincides with that of the engine block 13, is concentric with the longitudinal axis 14 and has a diameter such that it extends around the bearing block 24. By inserting appropriate axial and radial bearings between the cylinder bottom wall 28 and the housing bottom wall 22 on the one hand, and the cylinder cap 31 or the drive shaft 16 and the housing cap 23 on the other, the cylinder 26 is held rotatably inside the engine block 13.

Figure 2:
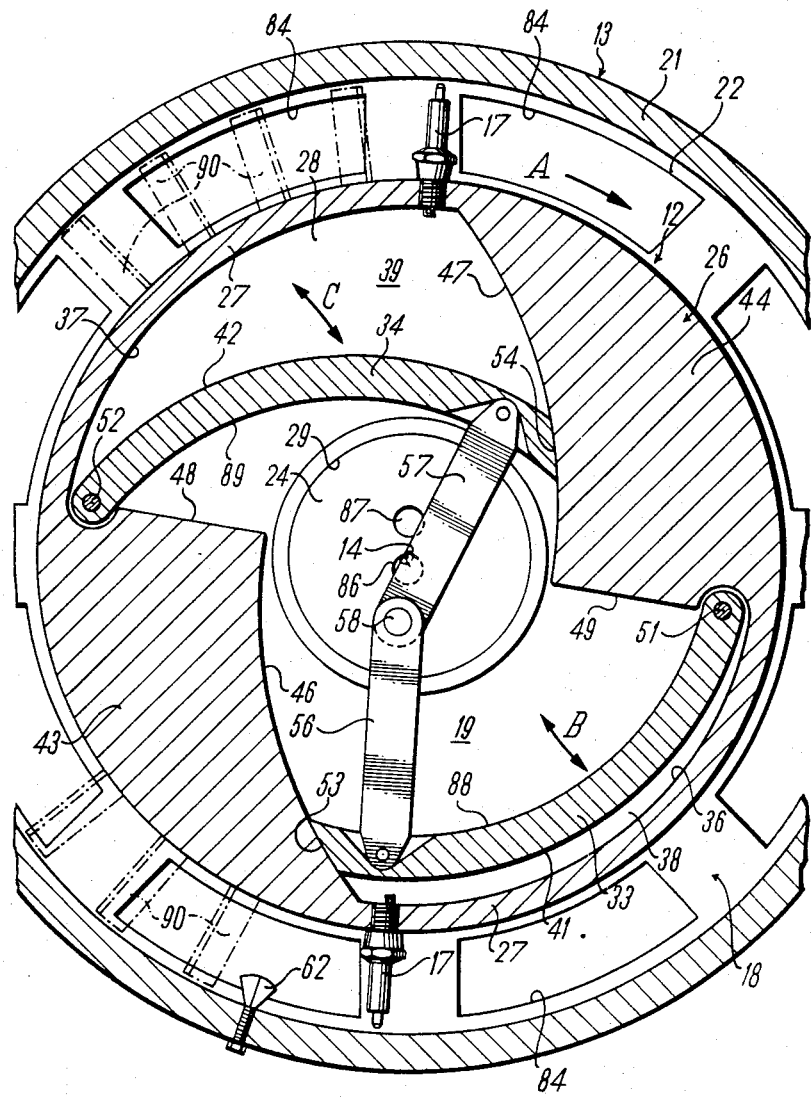
FIG. 2, is a horizontal section taken along the line II—II of FIG. 1.

The arrangement of two piston elements 33 and 34 inside the cylinder 26 is shown in FIG. 2. The piston elements 33 and 34, which are connected in a rotationally fixed manner with the cylinder 26, are pivotably supported inside the cylinder 26, and together with interior side wall surfaces 36, 37 and 46, 47 of circular-arc shape form two work chambers 38 and 39, which are variable in volume. The piston elements 33 and 34 are embodied in approximately crescent or circular-arc shape, and their outer face 41, 42, oriented toward the interior wall surface 36, 37 of the cylinder jacket 27, has a radius approximately the same length as, or somewhat shorter than, that of the interior side wall surfaces, 36, 37. Inwardly directed projections 43, 44 are disposed offset by approximately 90° from the interior wall areas 36 and 37, respectively, of the cylinder jacket 27. The projections 43, 44 are defined respectively by the circular-arc faces 46, 47 and radial faces 48, 49 extending at right angles thereto.

One end of each piston element 33, 34 is pivotably supported on the projection 43, 44, in the vicinity of the intersecting plane of the radial face 48, 49 and the interior side wall surface 36, 37 by means of an axially extending pivot shaft 51, 52. The shafts or pins 51 and 52 are connected with the cylinder bottom wall 28 and the cylinder cap 31. The free end of the piston element 33, 34 has a narrow, circular-arc-shaped sliding and sealing face 53, 54, the radius of which corresponds to that of the circular-arc face 46, 47 of the cylinder jacket projection 43, 44. In the vicinity of this free end, one one-armed lever 56, 57 is pivotably connected at one end with each piston element 33, 34. As shown in FIG. 1, the lever 56 connected to the piston element 33 is divided into two parts located parallel to and one above the other, while the lever 57 connected with the piston element 34 is located in a plane between these two lever parts. The two levers 56 and 57 are of substantially equal length and with their other end are pivotably supported in common on a stationary shaft 58, which stands off in the axial direction from the bearing block 24 of the housing bottom wall 22 and is disposed eccentrically with respect to the longitudinal axis 14 of the housing 13 or the cylinder 26.

As may also be seen from FIG. 2, the piston elements 33 and 34 are thus pivotable about their pivoting shafts 51, 52 in the directions of the double arrows B and C, thereby increasing or decreasing the size of the work chambers 38, 39. As a result, and by means of the levers 56, 57, the cylinder 26 is driven in the direction of the arrow A. In this connection it should also be noted that the spark plugs 17 are disposed in that area of the cylinder jacket 37 that protrude into an area of the work chambers 38, 39 which is oriented toward the free end of the piston elements 33, 34. The spark plugs 17 protrude into the work chambers 38, 39 with their ignition electrodes; that is, one spark plug 17 is associated with each work chamber or each piston element. The other or connecting end of the spark plugs 17 protrudes into an annular gap or outer chamber 18, which is formed between the cylinder 26 and the engine block 13 as a consequence of the concentric arrangement, yet different diameters, of these elements. At some location on the circumference of the housing jacket 21, a slide contact 62 protruding into the annular chamber 18 is provided. The slide contact 62 is connected to the generator or the battery and thus connects a given spark plug 17 periodically to voltage at a predetermined angle of rotation.

Figure 3:
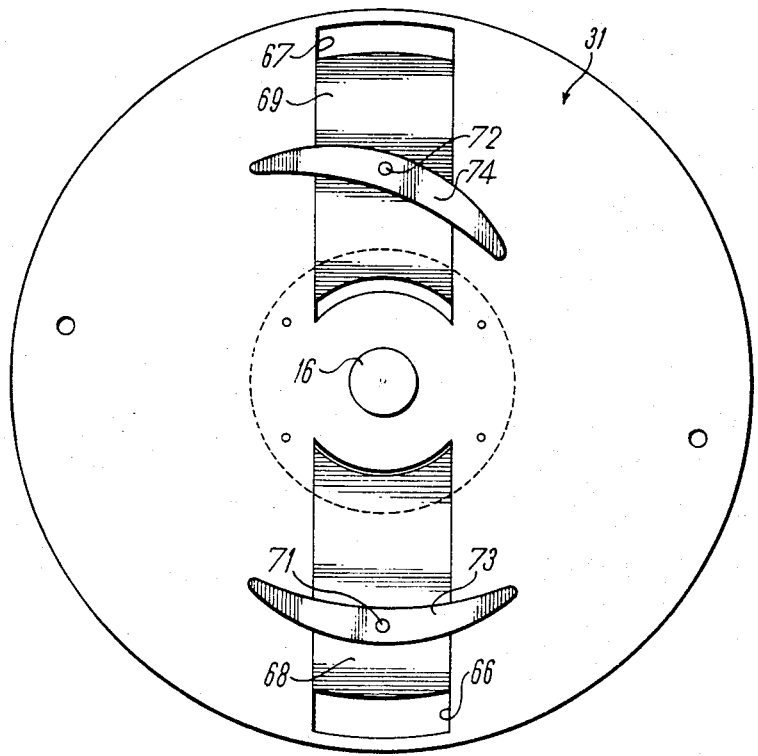
FIG. 3, is a plan view of a rotating piston assembly cap, the cap being provided with valve slides.

FIG. 3 shows the cylinder cap 31, which is removed from assembly. The cylinder cap 31 is provided with two diametrically opposed, radially extending slits 66, 67, in which valve slides 68, 69 are supported such that they are movable back-and-forth, i.e., reciprocate, in the radial direction. The valve slides 68, 69 have the same width as the slits 66, 67, but for the purpose of radial mobility the valve slides are shorter than the slits. The plate-like valve slides 68, 69 are provided approximately in their transverse and longitudinal center with an upright bolt 71, 72, onto which the slide blocks 73, 74 are pressed and on which they are pivotably supported. The slide blocks 73, 74 are shaped more or less like bananas. The slits 66, 67 are disposed in an area above the work chambers 38, 39, in fact above that portion which receives the spark plug 17 and the free end of the piston element 33, 34.

Figure 4:
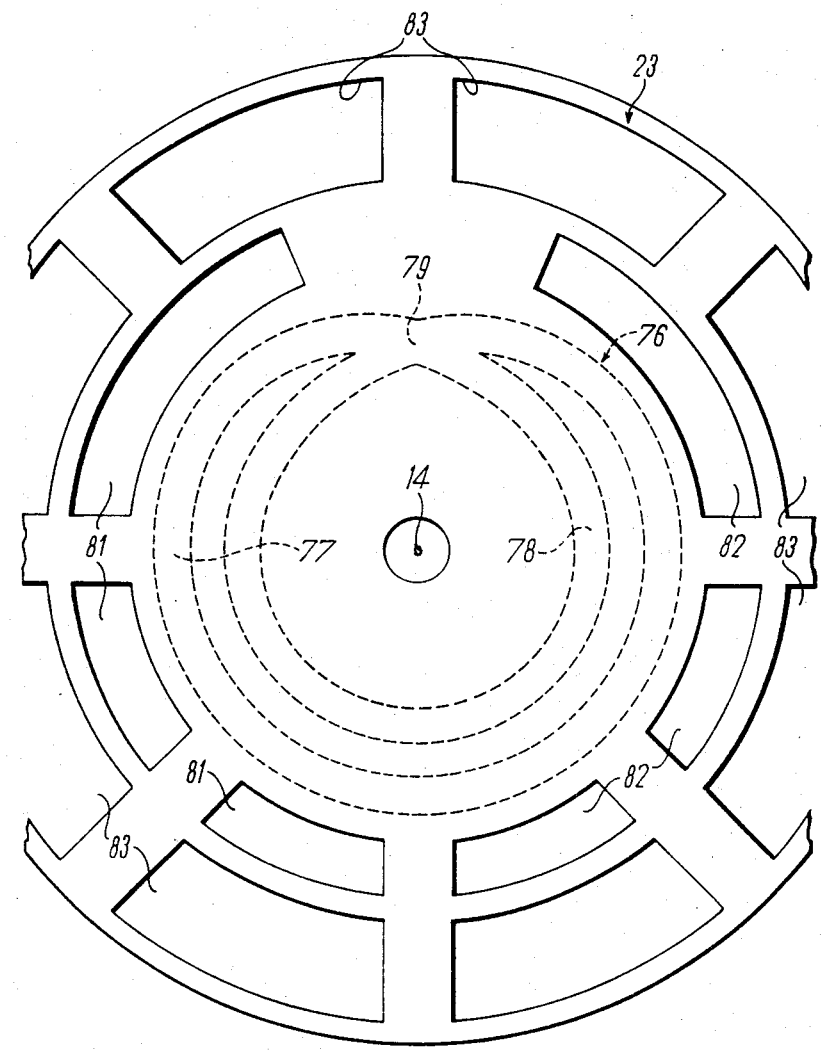
FIG. 4, is a plan view of the cap of the housing receiving the rotating piston assembly.

FIG. 4 shows the housing cap 23 removed from assembly. On its underside oriented toward the cylinder cap 31, the housing cap 23 is provided with a slotted-link guide 76, in the form of a groove track comprising two segments 77, 78 which intersect at one area 79. The two slotted-link track segments 77, 78 are circular over a substantial portion of the circumference, but because of their intersecting area 79 they are nested within one another in a somewhat pretzel-like fashion. In other words, the slotted-link guide track 76 comprises two circular-arc sections disposed concentrically to the longitudinal axis 14 and to one another, which merge with one another at the area of intersection 79. In any case, the course of the track is such that it is traversed in alternation from the inside to the outside and then from the outside to the inside. As may be seen in FIG. 1, the slide blocks 73, 74 of the valve slides 68, 69 engage the tracks 77, 78 of the slotted-link guide track 76 when the internal combustion engine 11 is fully assembled. That means that the valve slides 68, 69 are compelled to reciprocate in the radial direction in the slotted-link guide 76, which is held stationary, as the cylinder 26 rotates. The transition from closing to opening or from opening to closing of the valve slides 68, 69 takes place during the course of the passage of the slide blocks 73, 74 through the area of intersection 79.

The housing cap 23 is furthermore provided with an inner ring of openings 81, 82 of slit-like embodiment, for instance, concentric with the longitudinal axis 14. One set of openings is intended for the aspiration of the gas-air mixture, and the other set is intended for expelling the exhaust gases. These openings 81, 82 are not, however, provided in the angular vicinity of the intersection 79 of the slotted-guide tracks. The housing cap 23 furthermore has an outer ring of openings 83, located opposite openings 84 in the housing bottom 22. While one set of openings 83, 84 acts as the coolant inlet, the other set 83, 84 is intended as the outlet for the coolant.

If the coolant is air or water, for example, then it may be efficacious to provide guide vanes 90 along the entire outer circumference of the cylinder jacket 27 for the aspiration and/or expulsion of the coolant, as is indicated in part by dot-dash lines in FIGS. 1 and 2. In any event, this annular chamber 18 serves the purpose of externally cooling the engine 11. In the illustrated exemplary embodiment (FIG. 1), the internal cooling of the engine is provided such that a coolant inlet 86 and coolant outlet 87 are provided in the housing bottom wall 22, communicating with the inner chamber 19, which is defined by the outer sides 88, 89 of the piston elements 33, 34 and the faces 46–49 of the cylinder jacket 27. Since the volume of this inner chamber 19 varies periodically because of the movement of the piston elements, a compulsory impetus for the circulation of the coolant is simultaneously achieved, so that a separate coolant or oil pump is not required.

If oil is used as the coolant in the inner chamber 19, it is also possible to supply the sealing strips with lubricant, these being disposed in a manner not shown between the piston elements 33, 34 and the opposed faces of the individual parts of the cylinder 26.

The functioning of the internal combustion engine 11 having the rotating piston assembly 12 according to the invention is as follows:

If the elements shown in FIGS. 2-4 are combined with the apparatus shown in FIG. 1, the result is a specific relative position of the piston elements 33, 34, the valve slides 68, 69 and the slotted-link guide 76 to one another, which will be referred to as the outset position or the initial angular position of 0°. The position of the piston elements 33, 34 in this case is shown in FIG. 2, while the position of the valve slides 68, 69 is shown in FIG. 3 and that of the slotted-link guide 76 in FIG. 4. In this 0° position, the valve slide 68 is open, and the piston element 33 is in a transitional position between "expulsion" and "aspiration". The diametrically opposed valve slide 69 is in an intermediate position; that is, it is moving from its closed state into its open state, in which position the slit 67 is uncovered by the housing cap 23. The associated piston element 34 is in an intermediate position between "expansion" and "expulsion". As a consequence of the third or "expansion" stroke of the piston element 34, the piston assembly 12 rotates and the piston element 33 is displaced inwardly. Also the air mixture can be aspirated via the openings 81. The piston element 34 thereupon pivots outward, decreasing the size of the work chamber 39, so that the combusted exhaust gases can pass or be expelled to the outside via the opening 82. This third stroke ends after a rotation of 180° has taken place. During this 180° "stroke", the slide block 73 of the valve slide 68 is guided further along its inner track 77 and now, in this 180° position, reaches the outer track 78, which means that the valve slide 68 is in the process of closing the opening 66 to the work chamber 38. In contrast, the slide block 74 already reached the area of intersection 79 in the 0° position, that is, it was in the process of moving from the outer track 78 to the inner track 77, so that the associated valve slide 69 has opened the opening 67 to the work chamber 39 and remains open for the duration of the half rotation mentioned above. Thus in this position, the aspiration or suction process (first stroke) has ended with respect to the piston element 33, and the expulsion or exhaust process (fourth stroke) has ended with respect to the other piston element 34.

During the following 180° rotation, the piston element 33 is pivoted outward, reducing the size of the work chamber 38, and the piston element 34 is pivoted inward, increasing the size of the work chamber 39, which means that in the first work chamber 38 the gas-air mixture is compressed, and in the second work chamber 39 a fresh gas-air mixture is aspirated. During this half revolution, the first valve slide 68 is closed and the second valve slide 69 remains open.

Figure 5:
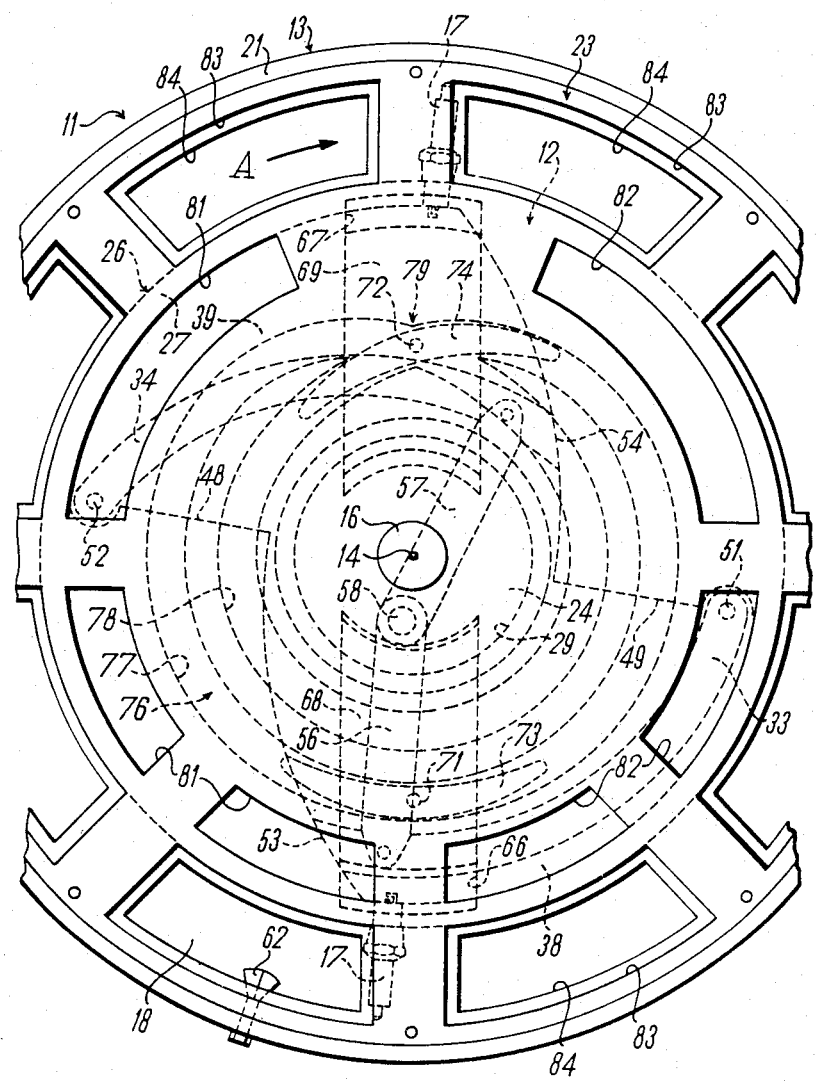
FIG. 5, is a plan view of the assembled unit seen along the arrow V of FIG. 1, but in a position on the part of the rotating piston assembly which is rotated by 360° relative to the views shown in FIGS. 1–4.

The final position of this stroke is shown in FIG. 5. Shortly after the maximum compression inside the first work chamber 38, the associated spark plug 17 comes into contact with the stationary slide contact 62, so that the compressed mixture is ignited. The third or "expansion" stroke follows, in terms of the first piston element 33, while the second piston element 34 compresses the aspirated gas-air mixture. Following this stroke, which is ended following a further revolution of 180°, in which the valve slide 68, 69 is kept closed or opened depending on the slotted-link guide 76, the next stroke takes place, which in terms of the first piston element 33 comprises the expulsion of the gas and in terms of the second piston element 34 comprises the expansion occurring after ignition of the spark plug with the aid of the slide contact 62. After this second complete revolution, that is, through an angle of 720°, the outset of 0° position described earlier is once again attained.

It will be understood that the internal combustion engine unit 11 shown as an exemplary embodiment and containing two work chambers can also be provided in the form of a larger engine using a plurality, for instance two, of such engine units. For example, two internal combustion engine units 11 may be disposed one above the other, their driven shafts being connected and/or being connected in common to a power output mechanism. The internal combustion engine according to the invention may be used for driving motor vehicles or ships as well as stationary machines and the like.

I claim:

1. An internal combustion engine having a housing including mixture inlet and exhaust gas outlet openings, a rotating piston assembly situated within said housing, and a drive shaft defining an axis of rotation, the rotating piston assembly comprising:
    a cylinder which rotates about its longitudinal axis, said cylinder including a transverse end wall having at least one slit formed therein and at least one interior side surface which extends in the direction of said longitudinal axis;
    a least one arcuate piston element having a free end defining a sealing surface, said piston element being situated within the cylinder and pivotably mounted at the end opposite to its free end to the cylinder for pivotal movement in the radial direction of the cylinder;
    at least one valve slide displaceably supported within a slit of the transverse end wall;
    lever means for each piston element for mounting the free end of said piston element to said housing eccentrically of the axis of rotation;
    means within the cylinder for engaging the sealing surface of the piston element;
    at least one work chamber defined by the piston element, an interior side surface and the transverse end wall; and
    means connected to the housing and the valve slide to control the movements of the valve slide to produce compulsory movement of the valve slide in accordance with the rotational movement of the cylinder, such that the slit alternately aligns itself with the inlet and outlet openings.

2. The internal combustion engine as defined in claim 1, wherein two piston elements are pivotably mounted within the cylinder, said piston elements being offset by 180°.

3. The internal combustion engine as defined in claim 1, the rotating piston assembly further comprising:
    an axially extending pivoting shaft for each piston element on which the end of a piston element opposite to its free end is mounted, each pivoting shaft being mounted adjacent to an interior side surface of maximum diameter, and wherein:
    the means for engaging the sealing surface of the piston element includes a further interior side surface of the cylinder which extends in the direction of said longitudinal axis, each further interior side surface extends into the cylinder and forms a segment of a circular arc about a respective pivoting shaft; and
    the sealing surface of each piston element slides along a respective further interior side surface.

4. The internal combustion engine as defined in claim 3, wherein:
    the face of each piston element is embodied in the shape of a circular arc and is oriented toward a work chamber corresponding in shape to an interior side surface of maximum diameter.

5. The internal combustion engine as defined in claim 1, wherein the lever means comprises:
    a lever for each piston element; and
    an axially extending lever shaft for the levers, wherein:
    each piston element is pivotably mounted at its free end to one end of a respective lever;
    the other end of each lever is pivotably mounted to a respective lever shaft; and
    lever shaft is disposed accentrically with respect to the axis of rotation of the cylinder, and is stationary with respect to the cylinder.

6. The internal combustion engine, wherein:
    two piston elements are pivotably mounted within the cylinder.

7. The internal combustion engine as defined in claim 5, wherein:
    the housing further includes a bottom wall having a bearing block which defines a bore concentrically disposed with respect to the axis of rotation of the cylinder; and
    each axially extending lever shaft is axially offstanding from the bearing block.

8. The internal combustion engine as defined in claim 1, wherein said means connected to said housing and the valve slide defines a stationary slotted-link guide in said housing, and wherein each valve slide is guided by the stationary slotted-link guide.

9. The internal combustion engine as defined in claim 8, wherein the housing further includes a cap wall provided on its underside oriented toward the cylinder, with the stationary slotted-link guide formed as machined grooves in said cap wall.

10. The internal combustion engine as defined in claim 8, wherein the rotating piston assembly further comprises a slotted-link block operatively associated with each valve slide, each slotted-link block having a circular-arc shape, and each being pivotably mounted on a respective valve slide, on the side thereof remote from the cylinder.

11. The internal combustion engine as defined in claim 8, wherein the stationary slotted-link guide comprises two slotted-link tracks which intersect one another in one area and in the remaining area are disposed concentrically relative to one another.

12. The internal combustion engine as defined in claim 11, wherein the rotating piston assembly further comprises a slotted-link block operatively associated with each valve slide, each slotted-link block having a circular-arc shape, and each being pivotably mounted on a respective valve slide, on the side thereof remote from the cylinder.

13. The internal combustion engine as defined in claim 11, wherein the slit in the transverse end wall extends radially.

14. The internal combustion engine as defined in claim 13, the rotating piston assembly further comprising:
an axially extending shaft for each piston element on which the end of a piston element opposite to its free end is mounted, each pivoting shaft being mounted adjacent to an interior side surface of maximum diameter, and wherein:
the radially extending slit is located in an area above that end of a work chamber located opposite an axially extending shaft of a piston element, and adjoins an interior side surface of maximum diameter.

15. The internal combustion engine as defined in claim 13, wherein:
two valve slides are displaceably supported with respect to the transverse end wall; and
the radially extending slits for each valve slide are located diametrically opposite to one another.

16. The internal combustion engine as defined in claim 15, the rotating piston assembly further comprising:
an axially extending pivoting shaft for each piston element on which the end of a piston element opposite to its free end is mounted, each pivoting shaft being mounted adjacent to an interior side surface of maximum diameter, and wherein:
each radially extending slit is located in an area above that end of a work chamber located opposite an axially extending shaft of a piston element, and adjoins an interior side surface of maximum diameter.

17. The internal combustion engine as defined in claim 1, wherein the transverse end wall is connected in a rotationally fixed manner to the drive shaft.

18. The internal combustion engine as defined in claim 1, wherein the housing further includes a bottom wall having a bearing block which defines a bore concentrically disposed with respect to the axis of rotation of the cylinder.

19. The internal combustion engine as defined in claim 18, wherein the lever means comprises:
a lever for each piston element; and
an axially extending levers shaft for the levers, wherein:
the axially extending lever shaft is axially offstanding from the bearing block.

20. The internal combustion engine as defined in claim 18, wherein the bearing block is secured in a stationary, offstanding manner on the bottom wall of the housing receiving the rotating piston assembly.

21. The internal combustion engine as defined in claim 1, wherein the housing further includes a bottom wall having a bearing block secured in a stationary, offstanding manner on said bottom wall, said bottom wall receiving the rotating piston assembly.

22. The internal combustion engine as defined in claim 21, wherein said means connected to the housing and the valve slide defines a stationary slotted-link guide, and wherein the housing further includes a cap wall provided, on its underside oriented toward the cylinder, with the stationary slotted-link guide formed as machined grooves.

23. The internal combustion engine as defined in claim 1, wherein said means connected to the housing and the valve slide defines a stationary slotted-link guide, andwherein the housing further includes a cap wall provided, on its underside oriented toward the cylinder, with the stationary slotted-link guide formed as machined grooves.

24. The internal combustion engine as defined in claim 1, wherein an annular gap is defined between the cylinder and the housing.

25. The internal combustion engine as defined in claim 24, wherein:
the housing further includes a cap wall and a bottom wall; and
in the area of the annular gap, the bottom wall and the cap wall are provided with axial openings.

26. The internal combustion engine as defined in claim 1, wherein:
the housing further includes a cap wall, said cap wall being provided, at a radius which corresponds to the location of each work chamber with slot-like openings distributed over the circumference of the cap wall; and
the slot-like openings define, individually or collectively, the mixture inlet to the engine.

27. The internal combustion engine as defined in claim 1, wherein:
the slit in the transverse end wall extends radially and each valve slide defines an opening in its respective slit;
the housing further includes a cap wall, said cap wall being provided, at a radius which corresponds to the location of the openings defined by the valve slides in their respective slits with slot-like openings, distributed over the circumference of the cap wall; and
the slot-like openings define, individually or collectively, the mixture inlet to the engine.

28. The internal combustion engine as defined in claim 1, wherein:
the housing further includes a cap wall, said cap wall being provided, at a radius which corresponds to the location of each work chamber with, slot-like openings, distributed over the circumference of the cap wall; and
the slot-like openings define, individually or collectively, the exhaust gas outlet of the engine.

29. The internal combustion engine as defined in claim 1, wherein:
the slit in the transverse end wall extends radially and each valve slide defines an opening in its respective recess slit;
the housing further includes a cap wall, said cap wall being provided, at a radius which corresponds to the location of the openings defined by the valve slides in their respective slits with, slot-like openings, distributed over the circumference of the cap wall; and
the slot-like openings define, individually or collectively, the exhaust gas outlet of the engine.

30. The internal combustion engine as defined in claim 1, the rotating piston assembly further comprising:
a coolant chamber defined within said cylinder, said coolant chamber being defined by at least the inwardly facing surface of each piston element.

31. The internal combustion engine as defined in claim 30, wherein the coolant in the coolant chamber is oil.

32. The internal combustion engine as defined in claim 1, wherein:
two piston elements are pivotably mounted within the cylinder;

a coolant chamber is defined by at least the inwardly facing surfaces of the two piston elements; and the coolant chamber is provided with inlet and outlet openings.

33. The internal combustion engine as defined in claim 32, wherein the coolant in the coolant chamber is oil.

34. The internal combustion engine as defined in claim 1, wherein the cylinder is provided with cooling fins on its outer circumference.

35. The internal combustion engine as defined in claim 1, said engine further having a spark plug operatively associated with each work chamber, each spark plug being disposed radially on the outer circumference of the cylinder and penetrating the cylinder wall, and a slide contact serving as the electrode for the spark plug, said slide contact being located on the circumference of the housing.

* * * * *